US009288238B2

(12) United States Patent  
Riffe et al.

(10) Patent No.: US 9,288,238 B2
(45) Date of Patent: Mar. 15, 2016

(54) OPTIMIZING CALL BEARER PATH USING SESSION INITIATION PROTOCOL PROXY

(71) Applicant: AT&T Intellectual Property I, LP, Atlanta, GA (US)

(72) Inventors: Scott Riffe, Bellevue, WA (US); Julie Fowler, Kirkland, WA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 195 days.

(21) Appl. No.: 14/063,380

(22) Filed: Oct. 25, 2013

(65) Prior Publication Data

US 2015/0117440 A1    Apr. 30, 2015

(51) Int. Cl.
*H04L 29/06*    (2006.01)
*H04W 4/00*    (2009.01)

(52) U.S. Cl.
CPC ............ *H04L 65/105* (2013.01); *H04L 65/103* (2013.01); *H04L 65/104* (2013.01); *H04L 65/1043* (2013.01); *H04L 65/1046* (2013.01); *H04L 65/1069* (2013.01); *H04W 4/00* (2013.01)

(58) Field of Classification Search
None
See application file for complete search history.

(56) References Cited

U.S. PATENT DOCUMENTS

| | | | |
|---|---|---|---|
| 7,031,747 B2 | 4/2006 | Cyr et al. | |
| 7,450,565 B2 | 11/2008 | Suotula et al. | |
| 8,243,715 B2 | 8/2012 | Itzkovitz et al. | |
| 8,249,054 B2 | 8/2012 | Witzel et al. | |
| 8,345,666 B2 | 1/2013 | Clair et al. | |
| 8,509,221 B2 | 8/2013 | Doshi et al. | |
| 2004/0214586 A1* | 10/2004 | Loganathan et al. | 455/456.2 |
| 2006/0209791 A1* | 9/2006 | Khadri et al. | 370/352 |
| 2009/0010270 A1* | 1/2009 | Ejzak | 370/401 |
| 2010/0103927 A1 | 4/2010 | Bakker | |
| 2010/0115034 A1* | 5/2010 | Sheth et al. | 709/206 |
| 2011/0122867 A1 | 5/2011 | Hirab | |
| 2012/0057573 A1 | 3/2012 | Piscopo | |

FOREIGN PATENT DOCUMENTS

EP     1973353 A1     9/2008

* cited by examiner

*Primary Examiner* — Christine Duong
(74) *Attorney, Agent, or Firm* — Guntin & Gust, PLC; Jay H. Anderson

(57) ABSTRACT

A system that incorporates the subject disclosure may include, for example, a serving device receiving a first message from a gateway device coupled to a communication network, the first message comprising a first session descriptor protocol relating to a port of the network connecting to equipment of a first subscriber of the network to originate a call to a mobile communication device of a second subscriber of the network, whereby the serving device and the gateway device comprise nodes on a signaling path for the call. The serving device sends a second message to the gateway device, the second message comprising a second session descriptor protocol relating to the serving device, for delivery to the network to facilitate a bearer path between the network and the serving device, wherein the gateway device is not a node of the bearer path. Other embodiments are disclosed.

20 Claims, 9 Drawing Sheets

200

800

OPTIMIZING CALL BEARER PATH USING SESSION INITIATION PROTOCOL PROXY

FIELD OF THE DISCLOSURE

This disclosure relates to telephone networks, and more specifically to optimizing a call bearer path between the originating endpoint and the terminating endpoint of a call.

BACKGROUND

In telephone networks serving mobile devices, for example Global System for Mobile Communications (GSM) networks, a call bearer path is established between the originating endpoint and the terminating endpoint of a call (calling party equipment and called party equipment respectively). Networks using a session initiation protocol (SIP) can route a call through multiple nodes while anchoring the bearer path only where required.

BRIEF DESCRIPTION OF THE DRAWINGS

Reference will now be made to the accompanying drawings, which are not necessarily drawn to scale, and wherein.

DETAILED DESCRIPTION

Figure 1:
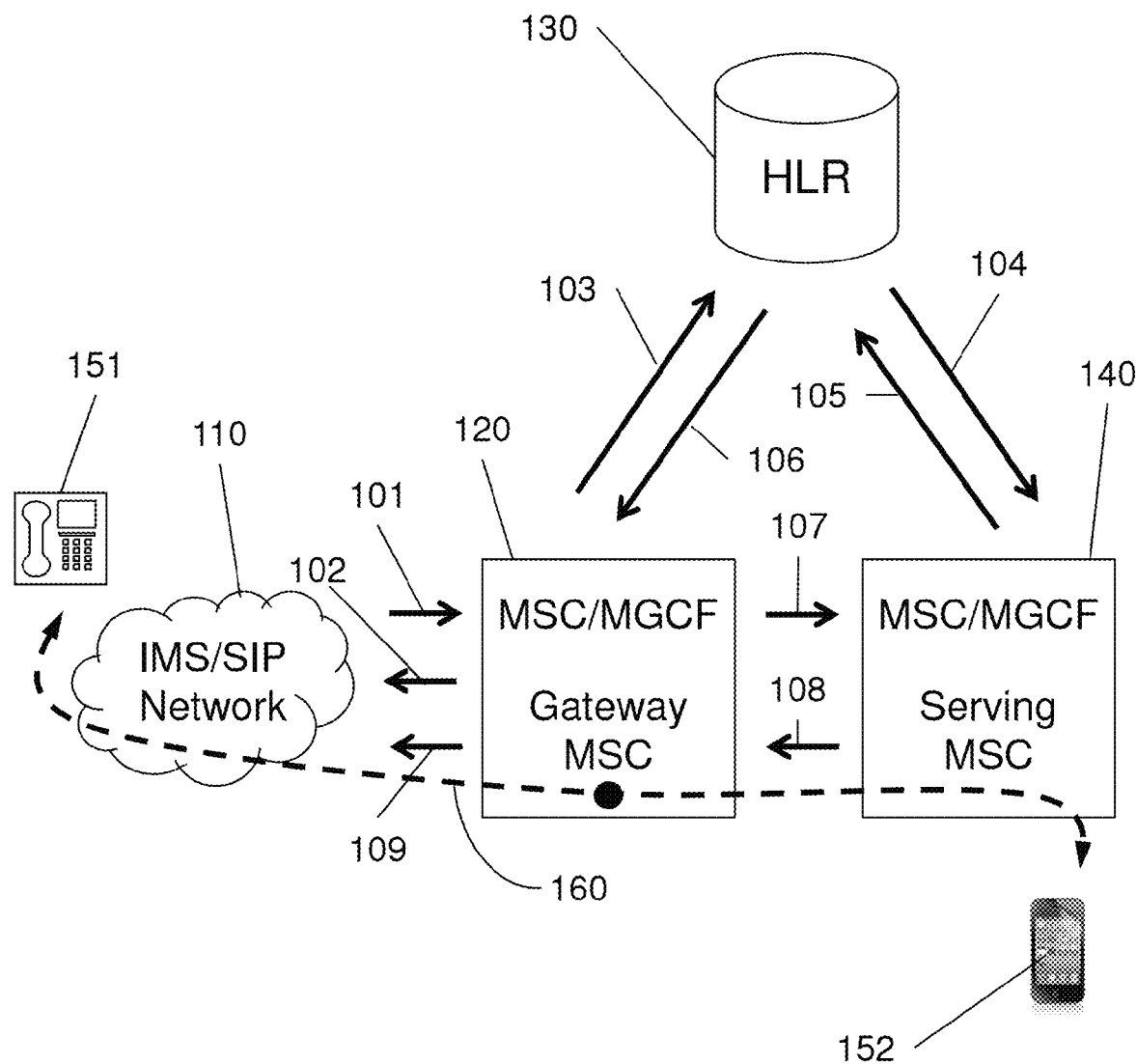
FIG. 1 depicts a typical communication system including telephone networks, in which a call bearer path is anchored at a gateway mobile switching center.

The subject disclosure describes, among other things, illustrative embodiments of devices and methods in which a mobile switching center (MSC) is merged with SIP proxy functionality to deliver calls from a SIP network to a subscriber via an optimized bearer path that does not need to traverse the MSC, so that the call is only anchored at the end points. Other embodiments are included in the subject disclosure.

One embodiment of the subject disclosure includes a device comprising a memory to store instructions and a controller coupled to the memory, wherein responsive to executing the instructions, the controller performs operations comprising receiving a first message via a communication network from originating equipment of a first subscriber of the communication network, the first message regarding origination of a call from the first subscriber to a mobile communication device of a second subscriber of the communication network. The operations also comprise sending a second message to a gateway device communicatively coupled with the network, the second message comprising a first session descriptor protocol relating to a port of the network connecting to the originating equipment, whereby the gateway device comprises a node on a signaling path for the call; and receiving a third message from the gateway device, the third message comprising a second session descriptor protocol relating to a serving device communicatively coupled with the mobile communication device, to facilitate a bearer path between the network and the serving device, wherein the bearer path is distinct from the signaling path and wherein the gateway device is not a node of the bearer path.

One embodiment of the subject disclosure includes device comprising a memory to store instructions; and a controller coupled to the memory, wherein responsive to executing the instructions, the controller performs operations comprising receiving a first message via a communication network, the first message regarding origination of a call from originating equipment of a first subscriber of the network to a mobile communication device of a second subscriber of the network, the first message comprising a first session descriptor protocol relating to a port of the network connecting to the originating equipment, the first message communicated via the network in accordance with a session initiation protocol. The operations also comprise obtaining routing information regarding the mobile communication device, the routing information comprising a mobile subscriber routing number; sending a second message to a serving device communicatively coupled with the mobile communication device, the second message comprising the mobile subscriber routing number and the first session descriptor protocol, whereby the device and the serving device comprise nodes on a signaling path for the call; receiving a third message from the serving device comprising a second session descriptor protocol relating to the serving device; and transmitting the second session descriptor protocol to the communication network to facilitate a bearer path between the network and the serving device, wherein the device is not a node of the bearer path.

One embodiment of the subject disclosure includes a device comprising a memory to store instructions and a controller coupled to the memory, wherein responsive to executing the instructions, the controller performs operations comprising receiving a first message from a gateway device communicatively coupled to a communication network, the first message comprising a first session descriptor protocol relating to a port of the communication network connecting to originating equipment of a first subscriber of the network to originate a call to a mobile communication device of a second subscriber of the network, whereby the device and the gateway device comprise nodes on a signaling path for the call. The operations also comprise sending a second message to the gateway device, the second message comprising a second session descriptor protocol relating to the device, for delivery to the communication network to facilitate a bearer path between the communication network and the device, wherein the gateway device is not a node of the bearer path.

FIG. 1 depicts a portion 100 of a typical communication network in which a call bearer path is established between two subscribers. In this illustration, subscriber equipment 151 is the originating device (calling party device) and subscriber equipment 152 is the terminating device (called party device). Devices 151, 152 can be examples of an internet protocol multimedia subsystem (IMS) communication device and a mobile device, respectively, as shown in FIG. 1. Calls can be routed through an IMS network 110 according to a session initiation protocol (SIP). A home location register (HLR) 130 is configured, in a manner understood in the art, to communicate with two mobile switching centers (MSCs): a gateway MSC 120 and a serving MSC 140. In this illustration, the serving MSC 140 serves the geographic area where subscriber device 152 is located, as shown in FIG. 1.

The gateway MSC 120 can receive a SIP INVITE message 101 from the SIP network. This message includes a session descriptor protocol (SDP) to be used in establishing the bearer path for the call. The gateway MSC responds with a message 102 back to the network that includes a SDP with an internet protocol (IP) address, port, and codec of the gateway MSC. The gateway MSC can transmit a Send Routing Information (SRI) message 103 to the HLR. The HLR transmits a Provide Routing Number (PRN) message 104 to the serving MSC, receives a Mobile Subscriber Routing Number (MSRN) message 105 from the serving MSC, and transmits the MSRN to the gateway MSC in message 106. The gateway MSC then sends a SIP INVITE message 107 to the serving MSC that includes a SDP with the IP address, port, and codec of the gateway MSC, and receives in message 108 a SDP with an IP address, port, and codec of the serving MSC. A bearer path is thus established between the network and the gateway MSC by virtue of the SDPs passed between the network and the gateway MSC in messages 101 and 102. A bearer path is also established between the gateway MSC and the serving MSC by virtue of the SDPs passed between the MSCs in messages 107 and 108. The gateway MSC then sends a message 109 indicating that a bearer path to the terminating device, traversing the gateway MSC, has been established. The bearer path 160 for the call accordingly has devices 151, 152 at its endpoints and is anchored at gateway MSC 120, as shown schematically in FIG. 1.

Figure 2:
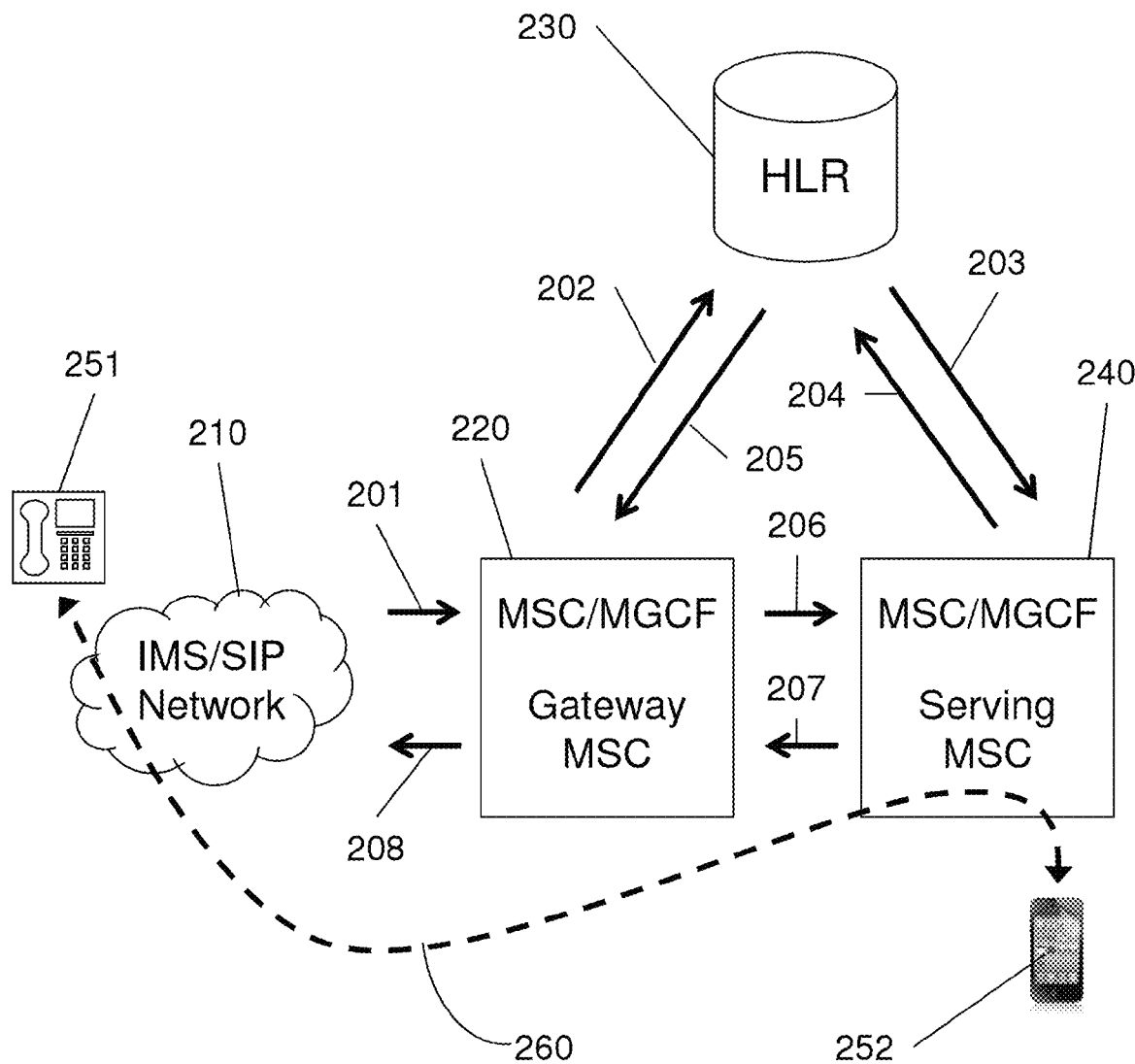
FIG. 2 schematically illustrates establishing a call bearer path using a method in accordance with an embodiment of the disclosure.

FIG. 2 depicts a portion 200 of a communication network in which a call bearer path is established between two subscribers, according to an embodiment of the disclosure. In this illustration, subscriber equipment 251 is the originating device for the call (calling party device) and subscriber equipment 252 is the terminating point (called party device). Devices 251, 252 can be examples of an IMS communication device and a mobile device, respectively, shown in FIG. 2. Device 251 connects to a port (originating port) of the IMS network. As shown schematically in FIG. 2, calls are routed through IMS network 210 according to a session initiation protocol (SIP). A home location register (HLR) 230 is configured to communicate with two MSCs: a gateway MSC 220 and a serving MSC 240. In this embodiment, the gateway MSC incorporates a media gateway control function (MGCF) so that it is SIP-capable—that is, gateway MSC 220 can send and receive SIP messages and function as a SIP proxy. In this embodiment, the serving MSC 240 has MGCF capabilities and serves the geographic area where subscriber device 252 is located, as shown in FIG. 2. Serving MSC 240 has a port (terminating port) for connecting to terminating device 252.

The gateway MSC 220, including MGCF functionality, can receive a SIP INVITE message 201 from the SIP network, and send a SIP INVITE message 206 to the serving MSC. The gateway MSC can transmit a Send Routing Information (SRI) message 202 to the HLR, and return a session descriptor protocol (SDP) message 208 to the originator of the call via the network 210.

The HLR 230 is configured to communicate with both the gateway MSC 220 and the serving gateway 240. In this embodiment, the HLR transmits a Provide Routing Number (PRN) message 203 to the serving MSC, and transmits a Mobile Subscriber Routing Number (MSRN) message 205 to the gateway MSC to establish the call signaling path between the originating and terminating devices.

In this embodiment, the serving MSC 240 transmits a message 204 with the MSRN information to the HLR, receives the SIP INVITE message 206 from the SIP-enabled gateway MSC 220, and sends a response 207 to the gateway MSC that includes the session descriptor protocol (SDP) of the terminating port. The SDP in message 207 has an IP address, port and codec for the serving MSC. The gateway MSC, acting as a SIP proxy, passes the SDP of the serving MSC directly to the IMS network in message 208. This permits the originating port of the IMS network to connect to the terminating port of the serving MSC.

In accordance with the disclosure, the call signaling path for the call runs through the gateway MSC, but the call bearer path 260 does not, as shown schematically in FIG. 2. Specifically, the communication network 210 receives the session descriptor protocol of the serving MSC 240 instead of receiving the session descriptor protocol of the gateway MSC 220. As a result, in contrast to the arrangement shown in FIG. 1, the gateway MSC 220 is not utilized in the bearer path.

Figure 3:
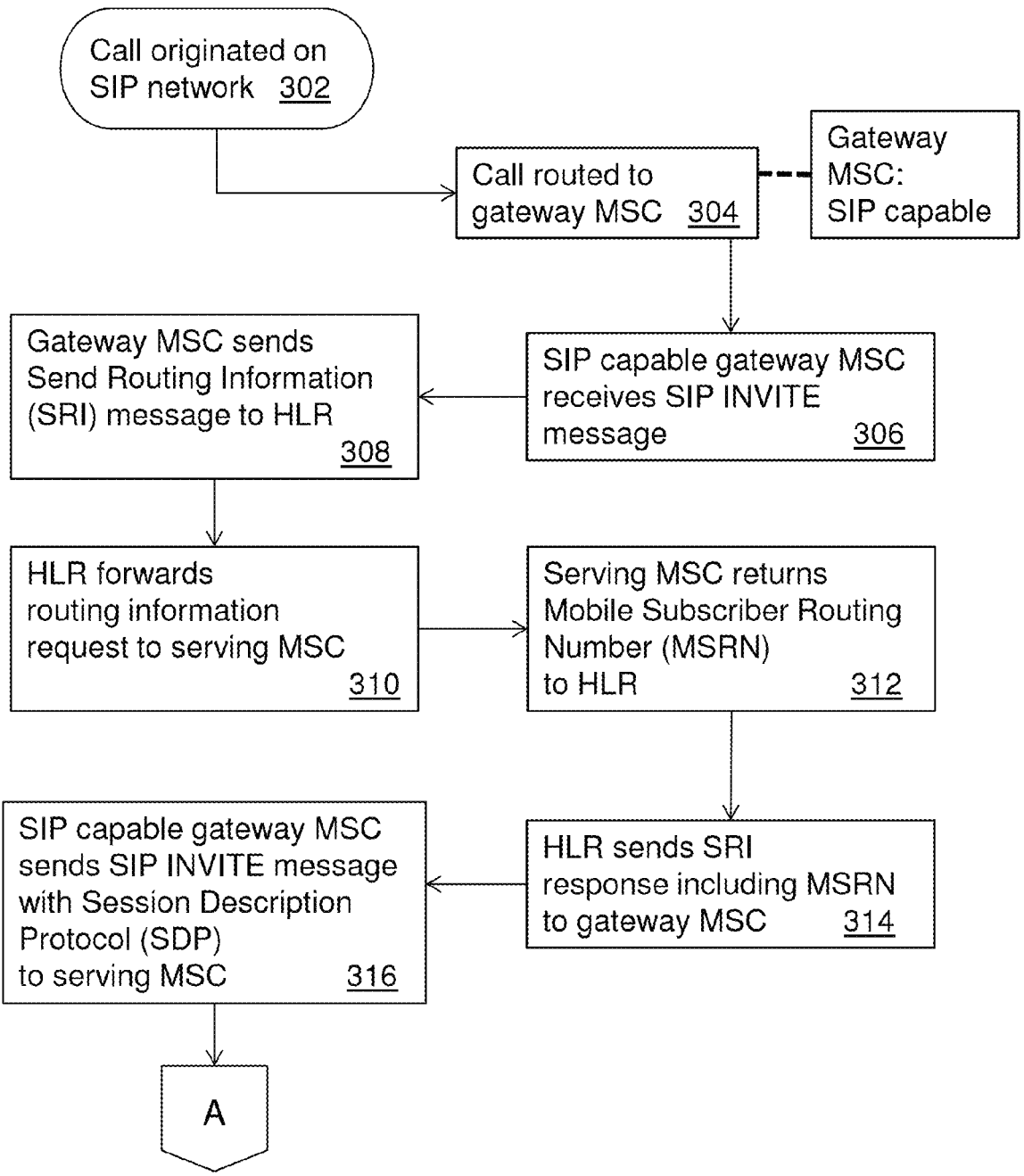
FIGS. 3-4 are connected flowcharts illustrating a procedure for establishing a call bearer path using network elements shown in FIG. 2, in accordance with embodiments of the disclosure.
Figure 4:
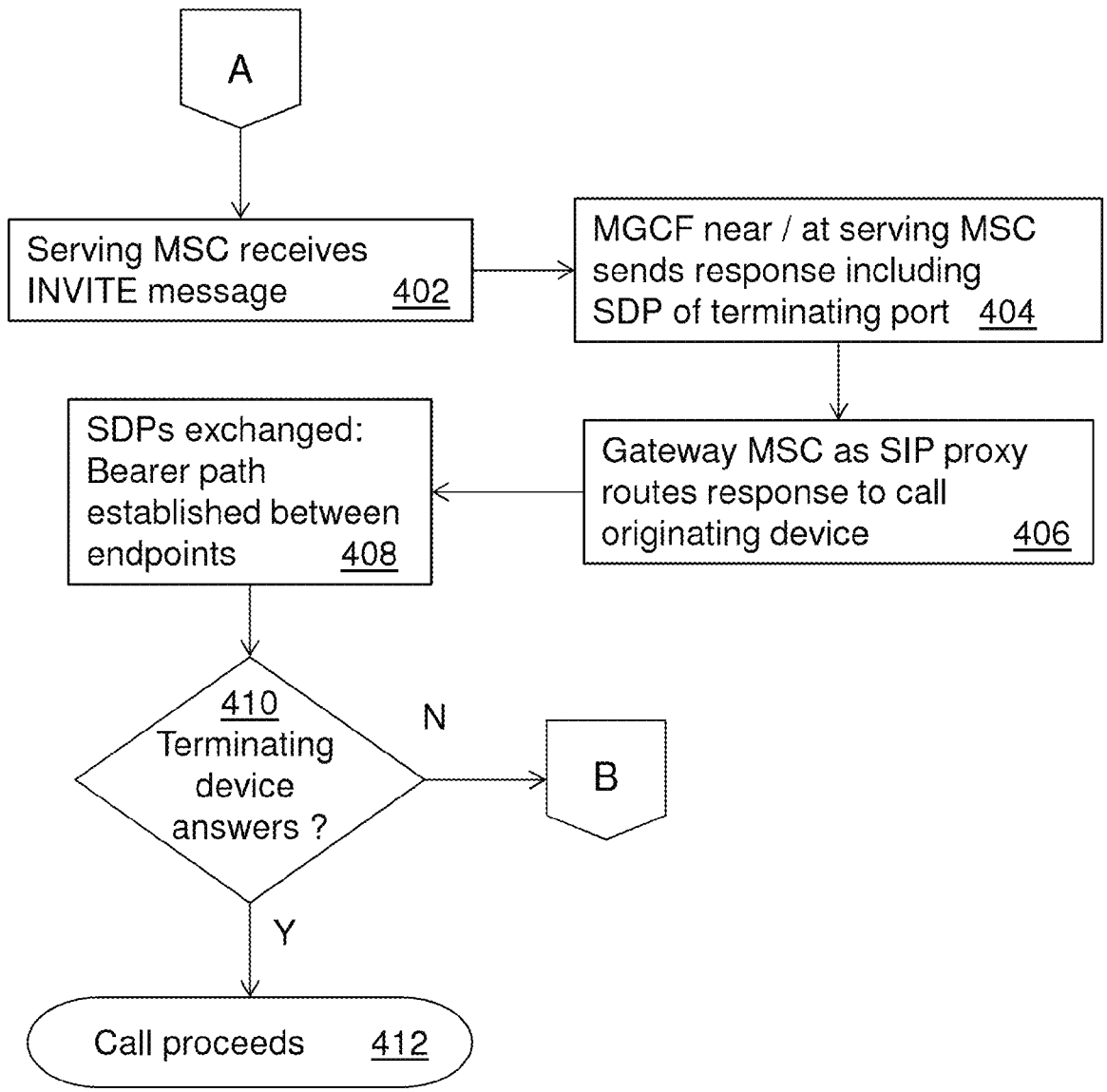

FIGS. 3 and 4 are connected flowcharts illustrating a procedure 300-400 for establishing a call bearer path between an originating device and a terminating device, in accordance with embodiments of the disclosure. The call is routed on an IMS network according to a SIP protocol, and the call bearer path is established using a HLR and MSCs configured as shown in FIG. 2. In particular, the gateway MSC 220 has MGCF functionality so that it can act as a SIP proxy. In this illustration, the call is originated on the IMS/SIP network (step 302), for example by device 251, and is directed to a mobile subscriber, for example device 252.

The call is routed from the SIP network to the gateway MSC (step 304). When an incoming SIP INVITE message 201 reaches the gateway MSC (step 306), the gateway MSC uses its functionality to trigger a Send Routing Information (SRI) message 202 to the HLR (step 308). The HLR forwards the routing information request as a PRN message 203 to the serving MSC (step 310). The serving MSC responds by sending a MSRN message 204 to the HLR (step 312). The HLR then sends a message 205 to the gateway MSC, responding to the previous SRI message (step 314). Message 205 includes the MSRN provided by the serving MSC.

The SIP-capable gateway MSC then sends its own SIP INVITE message 206 to the serving MSC. Message 206 also includes a called party number of the MSRN and the session descriptor protocol (SDP) of the original SIP INVITE message 201 from the SIP network (step 316).

The INVITE message 206 is received by the serving MSC (step 402) and is then answered by the media gateway control function at or near the serving MSC (step 404). In this embodiment, the serving MSC has MGCF capabilities. Alternatively, message 306 is answered by the MGCF closest to the serving MSC. The response 207 from the MGCF (at or near the serving MSC) includes the SDP of the terminating port of the serving MSC (the terminating node of the call bearer path). In step 406, the SDP of the terminating port is routed back through the gateway MSC (acting as a SIP proxy) and ultimately back to the originator of the call. The SDP from the original SIP INVITE and the SDP of the terminating device are thus exchanged between the end points of the call. In step 408, the SDP and the serving MGCF (in this embodiment, the serving MSC with MGCF capabilities) then set up the bearer path between the two end points. The call signaling path remains anchored to the gateway MSC, but the call bearer path is not. The call bearer path can be established from the originating SIP anchor point directly to the serving MGCF (or serving MSC with MGCF capabilities). This bearer path accordingly can provide reduced intermediate hops, transcoders, and latency while freeing up resources at the gateway MSC for additional call capacity.

Figure 5:
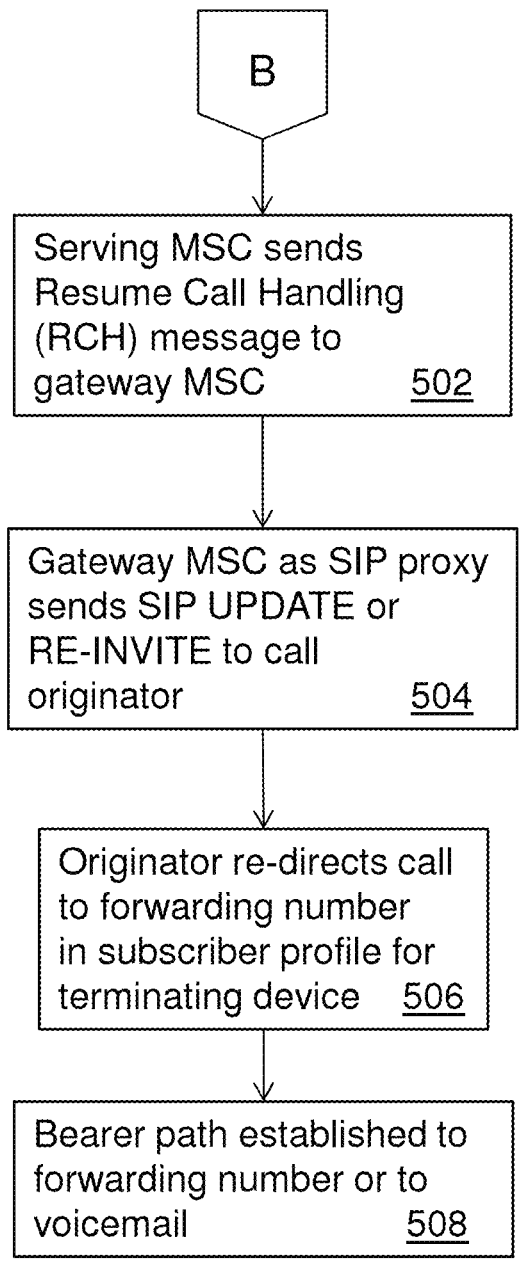
FIG. 5 is a flowchart illustrating a procedure for establishing a call bearer path for call forwarding, in accordance with an embodiment of the disclosure.

After the bearer path is established between the originating (calling party) device 251 and the terminating (called party) device 252, the terminating device typically answers and the call proceeds (steps 410, 412). However, there can be cases of "late call forwarding" where the call is delivered to the serving MSC/MGCF, but the terminating device does not answer. A procedure 500 that can be invoked in this situation, according to an embodiment, is shown in FIG. 5. In this embodiment, the serving MSC sends a Resume Call Handling (RCH) message back to the gateway MSC (step 502). The RCH message includes the call forwarding number configured on the subscriber profile associated with the terminating device 252. This is typically a voice mail deposit number of a subscriber voice mail system. The gateway MSC (having MGCF functionality) sends a SIP UPDATE or re-INVITE message to the SIP originator (step 504) with the call forwarding number. The originator can then redirect the call (step 506) so that the bearer path is established between the originator and the forwarding number, for example the subscriber's voice mail deposit number (step 508). As in the case detailed previously, the gateway MSC does not need to anchor the bearer path for the re-directed call.

Figure 6:
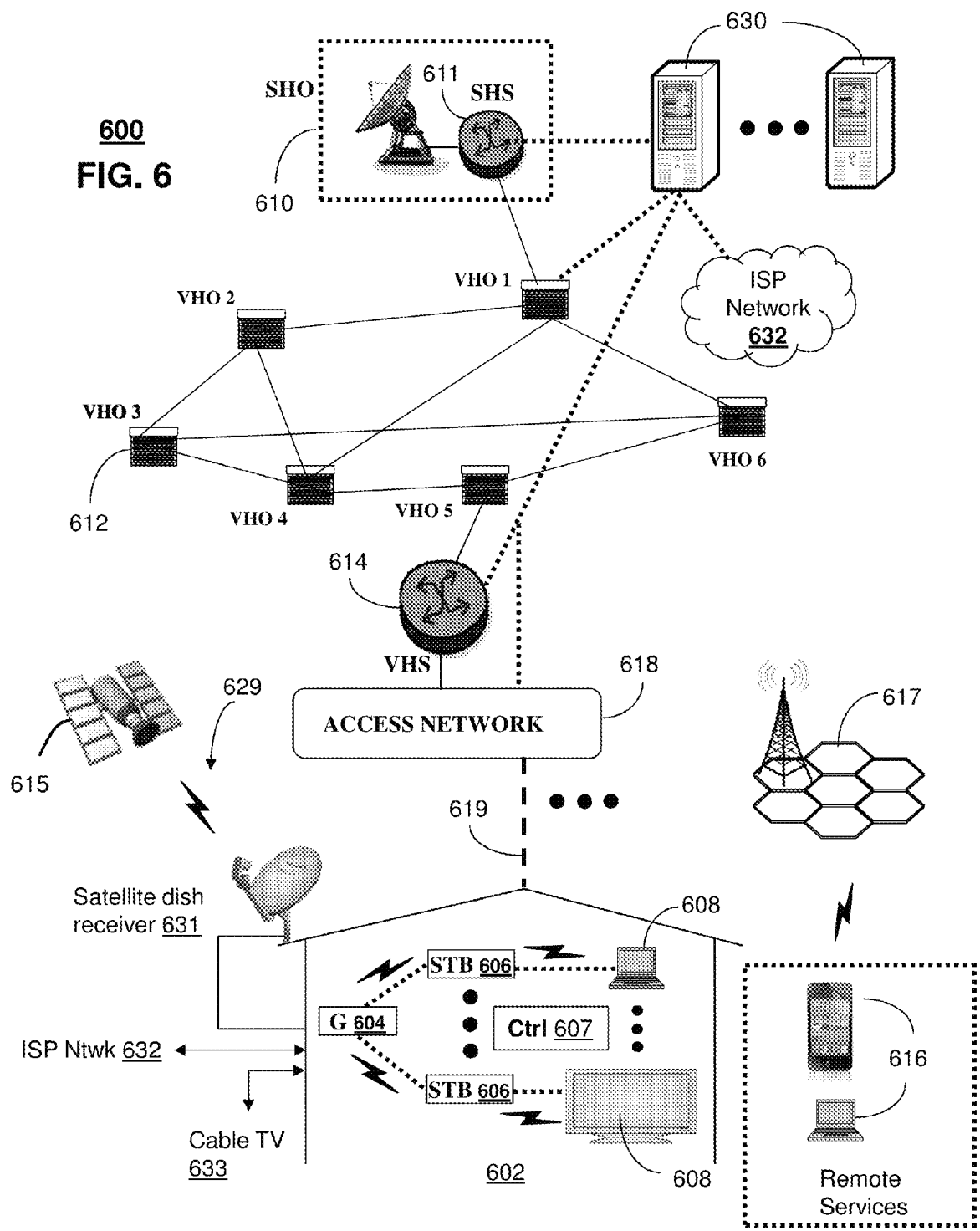
FIG. 6 depicts an illustrative embodiment of a communication system including a wireless communication network.

FIG. 6 depicts an illustrative embodiment of a first communication system 600 for delivering media content. The communication system 600 can represent an Internet Protocol Television (IPTV) media system. Communication system 600 can be overlaid or operably coupled with the network elements shown in FIG. 2 as another representative embodiment of communication system 600. For example, one or more of the servers 630 can function as a gateway MSC that is SIP-enabled and can serve as a SIP proxy for transmitting messages including session descriptor protocols.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as MSC 220, HLR 230, or MSC 240. The devices 630 can use computing and communication technology to send, receive and process messages in accordance with a session initiation protocol, which can include among other things, passing a session descriptor protocol of a serving MSC to an IMS network to facilitate a bearer path between the network and the serving MSC without using a gateway MSC to anchor the bearer path. The media processors 606 and wireless communication devices 616 can be provisioned with software functions to utilize the services of devices 630.

Figure 7:
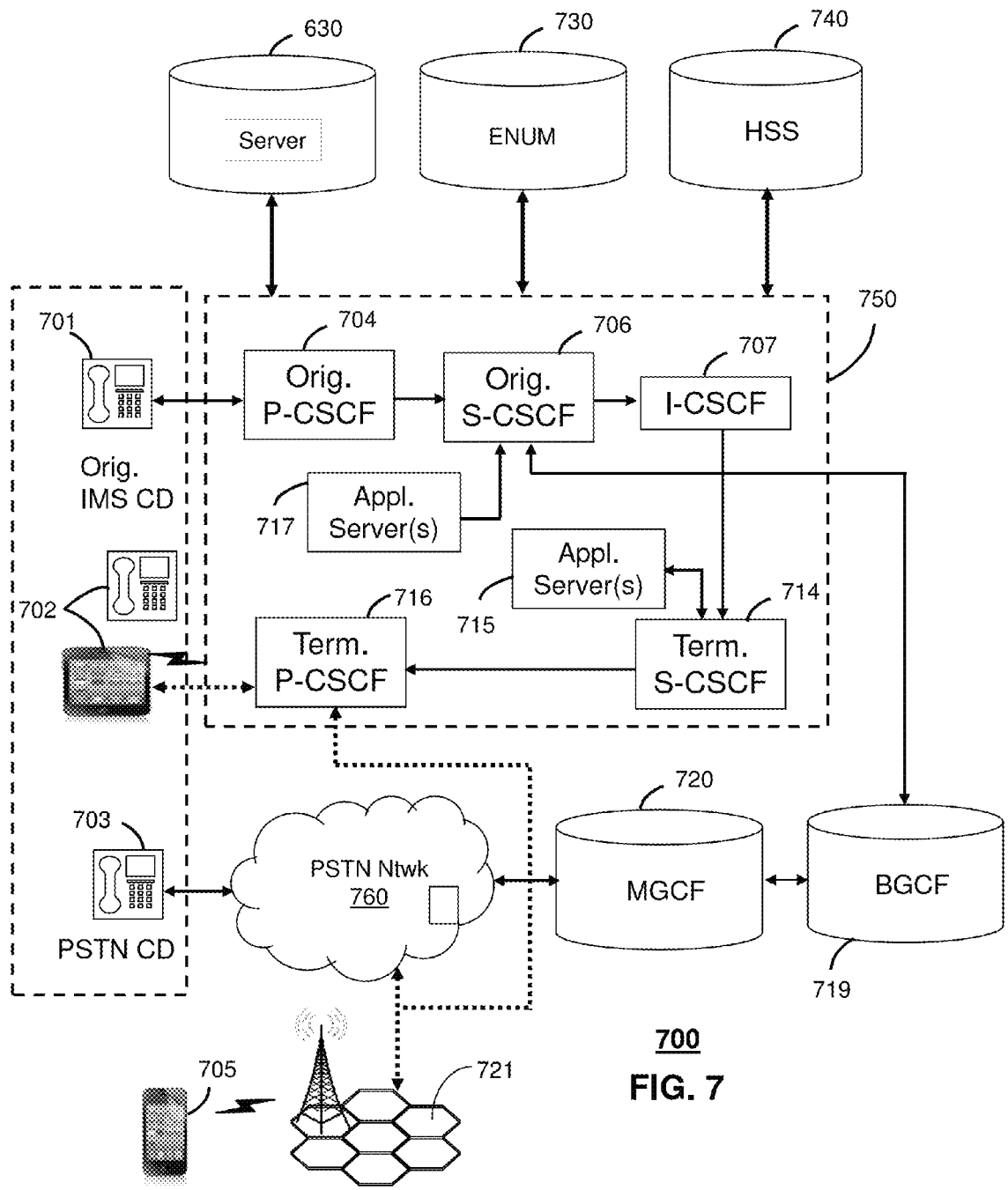
FIG. 7 depicts an illustrative embodiment of a communication system including telephone networks.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with the network elements shown in FIG. 2 and communication system 600 as another representative embodiment of communication system 600. For example, one or more of the servers shown can include a media gateway control function (MGCF) and comprise a memory to store instructions; and a controller coupled to the memory, wherein responsive to executing the instructions, the controller performs operations comprising receiving a first message via a communication network, the first message regarding origination of a call from originating equipment of a first subscriber of the network to a mobile communication device of a second subscriber of the network, the first message comprising a first session descriptor protocol relating to a port of the network connecting to the originating equipment, the first message communicated via the network in accordance with a session initiation protocol. The operations can also comprise obtaining routing information regarding the mobile communication device, the routing information comprising a mobile subscriber routing number; sending a second message to a serving device communicatively coupled with the mobile communication device, the second message comprising the mobile subscriber routing number and the first session descriptor protocol, whereby the device and the serving device comprise nodes on a signaling path for the call; receiving a third message from the serving device comprising a second session descriptor protocol relating to the serving device; and transmitting the second session descriptor protocol to the communication network to facilitate a bearer path between the network and the serving device, wherein the device is not a node of the bearer path.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers 715 may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
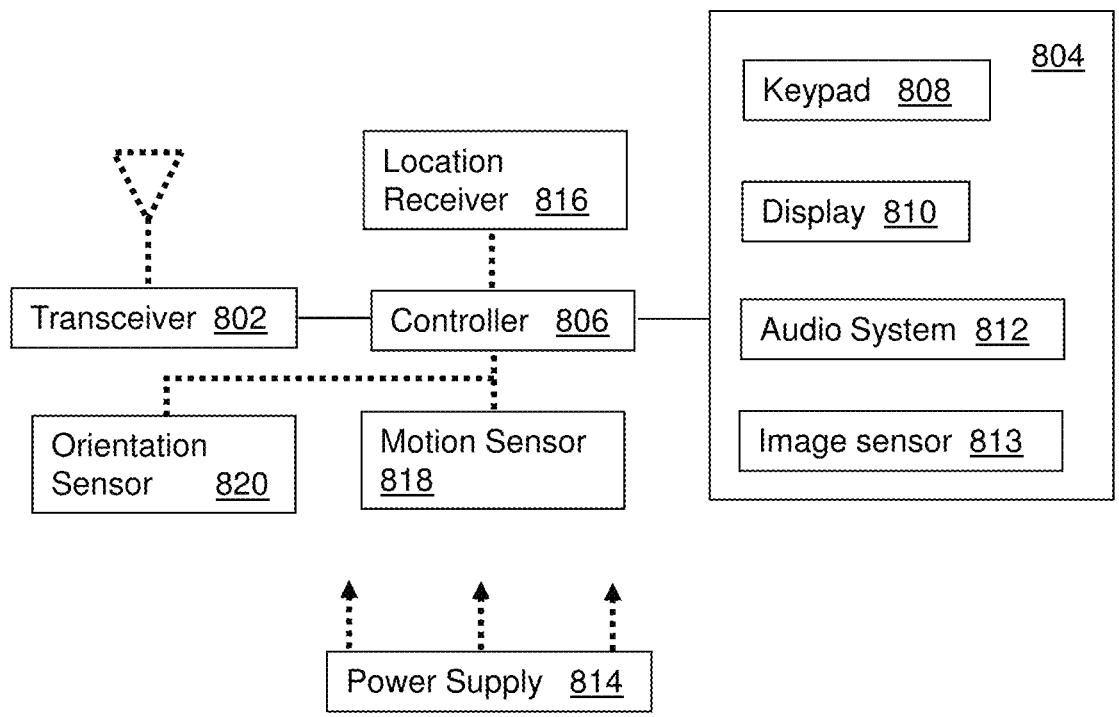
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIG. 2. For example, device 800 can comprise a memory to store instructions and a controller coupled to the memory, wherein responsive to executing the instructions, the controller performs operations comprising receiving a first message from a gateway device communicatively coupled to a communication network, the first message comprising a first session descriptor protocol relating to a port of the communication network connecting to originating equipment of a first subscriber of the network to originate a call to a mobile communication device of a second subscriber of the network, whereby the device and the gateway device comprise nodes on a signaling path for the call. The operations can also comprise sending a second message to the gateway device, the second message comprising a second session descriptor protocol relating to the device, for delivery to the communication network to facilitate a bearer path between the communication network and the device, wherein the gateway device is not a node of the bearer path.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 100 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 606, the media devices 608, or the portable communication devices 616 of FIG. 6, as well as the IMS CDs 701-702 and PSTN CDs 703, 705 of FIG. 7. It will be appreciated that the communication device 800 can also represent other devices that can operate in communication systems 600-700 of FIGS. 6-7 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
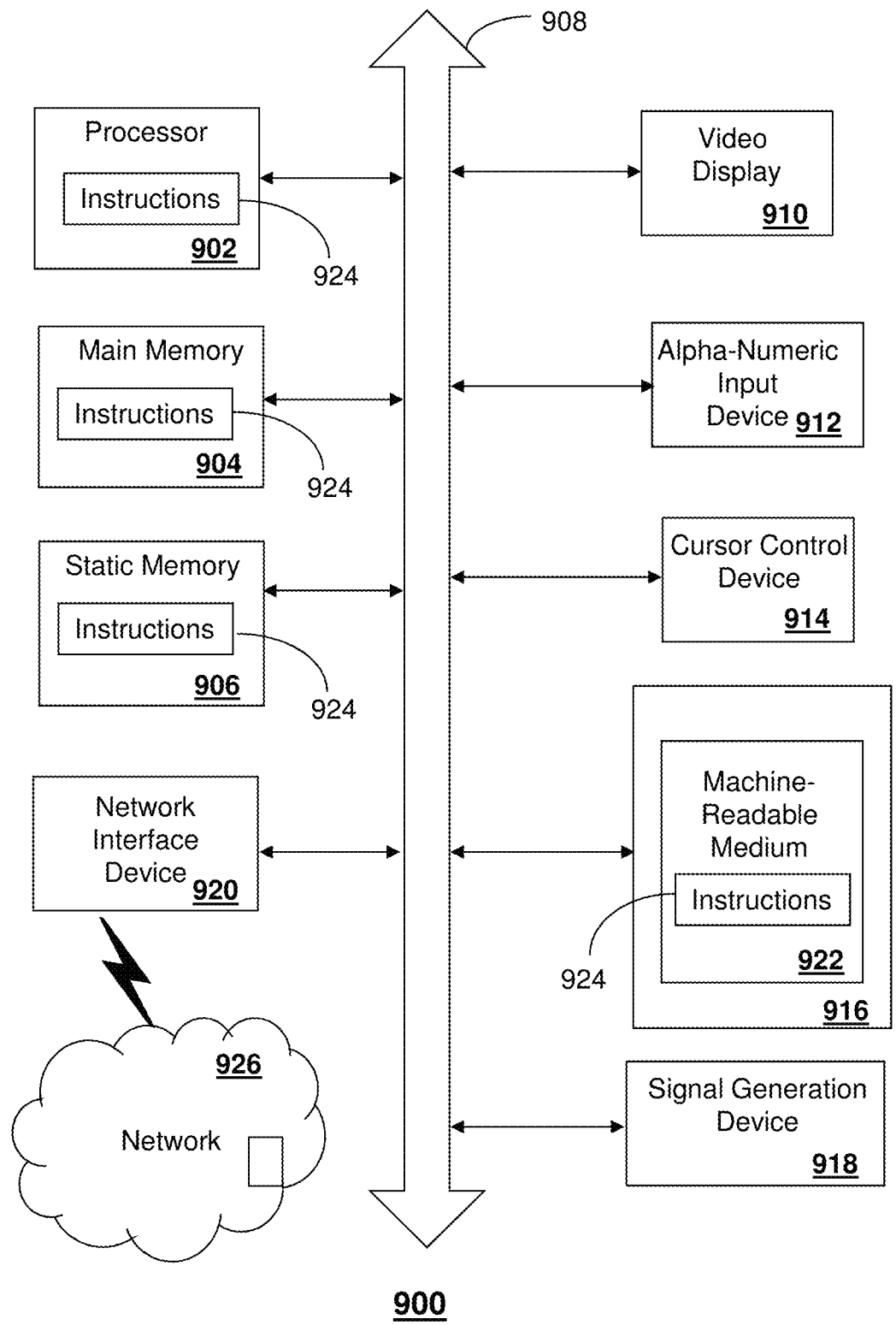
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the gateway MSC 220 or the serving MSC 240. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A call session control function server comprising:
a memory to store instructions; and
a controller coupled to the memory, wherein responsive to executing the instructions, the controller performs operations comprising:
receiving a first message via a communication network from originating equipment of a first subscriber of the communication network, the first message regarding origination of a call from the first subscriber to a mobile communication device of a second subscriber of the communication network;
sending a second message to a gateway mobile switching center communicatively coupled with the communication network, wherein the gateway mobile switching center comprises a session initiation protocol proxy server, and wherein the second message comprising a first session descriptor protocol relating to a port of the communication network connecting to the originating equipment, whereby the gateway mobile switching center comprises a node on a signaling path for the call;
receiving a third message directly from the gateway mobile switching center, the third message comprising a second session descriptor protocol relating to a serving mobile switching center communicatively coupled with the mobile communication device, to facilitate a bearer path between the communication network and the serving mobile switching center,
wherein the gateway mobile switching center is not utilized in the bearer path as a result of the communication network receiving the second session descriptor protocol of the serving mobile switching center instead of receiving a third session descriptor protocol of the gateway mobile switching center.

2. The call session control function server of claim 1, wherein the second session descriptor protocol comprises an internet protocol address and a port of the serving mobile switching center.

3. The call session control function server of claim 2, wherein the call session control function server comprises a portion of an internet protocol multimedia subsystem network.

4. The call session control function server of claim 3, wherein the second message is an invite message in accordance with the session initiation protocol.

5. The call session control function server of claim 1, wherein the second message is an invite message in accordance with a session initiation protocol, and wherein the operations further comprise:
receiving a fourth message from the gateway mobile switching center, the fourth message comprising an update or re-invite message and a forwarding number in accordance with a profile associated with the second subscriber; and
causing the call to be directed to the forwarding number.

6. The call session control function server of claim 5, wherein the forwarding number is a voice mail deposit number of a subscriber voice mail system.

7. A device comprising:
a memory to store instructions; and
a controller coupled to the memory, wherein responsive to executing the instructions, the controller performs operations comprising:

receiving a first message via a communication network, the first message regarding origination of a call from originating equipment of a first subscriber of the communication network to a mobile communication device of a second subscriber of the communication network, the first message comprising a first session descriptor protocol relating to a port of the communication network connecting to the originating equipment, the first message communicated via the communication network in accordance with a session initiation protocol;

obtaining routing information regarding the mobile communication device, the routing information comprising a mobile subscriber routing number;

sending a second message to a serving device communicatively coupled with the mobile communication device, the second message comprising the mobile subscriber routing number and the first session descriptor protocol, whereby the device and the serving device comprise nodes on a signaling path for the call;

receiving a third message from the serving device, the third message comprising a second session descriptor protocol relating to the serving device;

transmitting, as a session initiation protocol proxy server, the second session descriptor protocol directly to the communication network to facilitate a bearer path between the communication network and the serving device, wherein the device is not a node of the bearer path.

8. The device of claim 7, wherein the serving device is a serving mobile switching center, and wherein the second session descriptor protocol comprises an internet protocol address and a port of the serving mobile switching center.

9. The device of claim 7, wherein the device is a gateway mobile switching center for sending and receiving messages according to a session initiation protocol, and the first message is an invite message in accordance with the session initiation protocol.

10. The device of claim 7, wherein the operations further comprise sending a query to a home location register for the routing information, and wherein the mobile subscriber routing number is returned to the home location register from the serving device.

11. The device of claim 7, wherein the device comprises a session initiation protocol proxy server, and the second message is an invite message in accordance with the session initiation protocol.

12. The device of claim 11, wherein the invite message includes a called party number of the mobile subscriber routing number.

13. The device of claim 7, wherein the operations further comprise:

receiving a fourth message from the serving device, the fourth message comprising a Resume Call Handling message and a forwarding number in accordance with a profile associated with the second subscriber; and sending a fifth message to the communication network, the fifth message comprising an update or re-invite message in accordance with a session initiation protocol to cause the call to be directed to the forwarding number.

14. The device of claim 13, wherein the forwarding number is a voice mail deposit number of a subscriber voice mail system.

15. A device comprising:

a memory to store instructions; and a controller coupled to the memory, wherein responsive to executing the instructions, the controller performs operations comprising:

receiving a first message from a gateway device communicatively coupled to a communication network, wherein the gateway device comprises a session initiation protocol proxy server, and wherein the first message comprises a first session descriptor protocol relating to a port of the communication network connecting to originating equipment of a first subscriber of the communication network to originate a call to a mobile communication device of a second subscriber of the communication network, whereby the device and the gateway device comprise nodes on a signaling path for the call;

sending a second message to the gateway device, the second message comprising a second session descriptor protocol relating to the device, for delivery directly to the communication network to facilitate a bearer path between the communication network and the device, wherein the gateway device is not a node of the bearer path.

16. The device of claim 15, wherein the device is a serving mobile switching center communicatively coupled with the mobile communication device, and wherein the second session descriptor protocol comprises an internet protocol address and a port of the serving mobile switching center.

17. The device of claim 15, wherein the operations further comprise sending a mobile subscriber routing number associated with the mobile communication device to a home location register in accordance with a query to the home location register from the gateway device.

18. The device of claim 17, wherein the first message is an invite message in accordance with a session initiation protocol, and wherein the invite message includes a called party number of the mobile subscriber routing number.

19. The device of claim 15, wherein the device comprises a media gateway control function.

20. The device of claim 15, wherein the operations further comprise sending a third message to the gateway device, the third message comprising a Resume Call Handling message and a forwarding number in accordance with a profile associated with the second subscriber.

* * * * *